(12) United States Patent
     Hahn (10) Patent No.: US 9,383,743 B2
(45) Date of Patent: Jul. 5, 2016

(54) SIMULTANEOUS RETOOLING OF PROCESSING DEVICES

(75) Inventor: Wolfgang Hahn, Neutraubling (DE)

(73) Assignee: Krones AG, Neutraubling (DE)

( * ) Notice: Subject to any disclaimer, the term of this patent is extended or adjusted under 35 U.S.C. 154(b) by 898 days.

(21) Appl. No.: 13/699,221

(22) PCT Filed: Mar. 27, 2012

(86) PCT No.: PCT/EP2012/055395
§ 371 (c)(1),
(2), (4) Date: Nov. 20, 2012

(87) PCT Pub. No.: WO2012/163562
PCT Pub. Date: Dec. 6, 2012

(65) Prior Publication Data
US 2013/0211575 A1    Aug. 15, 2013

(30) Foreign Application Priority Data

May 30, 2011    (DE) .......................... 10 2011 050 724

(51) Int. Cl.
*G06F 19/00*     (2011.01)
*G05B 19/4093*   (2006.01)
*B29C 49/42*     (2006.01)
*B29C 49/48*     (2006.01)
*B29C 49/78*     (2006.01)
*B29C 33/30*     (2006.01)

(52) U.S. Cl.
CPC .......... *G05B 19/40938* (2013.01); *B29C 33/30* (2013.01); *B29C 49/42* (2013.01); *B29C 49/48* (2013.01); *B29C 49/78* (2013.01); *B29C 2049/4858* (2013.01)

(58) Field of Classification Search
CPC  B29C 2049/4858; B29C 33/30; B29C 49/42; B29C 49/48; B29C 49/78; G05B 19/40938
USPC .......................................................... 700/179
See application file for complete search history.

(56) References Cited

U.S. PATENT DOCUMENTS 5,064,328 A  *  11/1991  Raker ....................... F16P 3/10
                                                   227/1
6,644,192 B2    11/2003  Dilling et al.
8,033,809 B2    10/2011  Christiansen
8,069,545 B2    12/2011  Stoiber (Continued)

FOREIGN PATENT DOCUMENTS

CN      101466491      6/2009
CN      102 009 442    4/2011

(Continued)

*Primary Examiner* — Mohammad Ali
*Assistant Examiner* — Yuhui R Pan
(74) *Attorney, Agent, or Firm* — Davidson, Davidson & Kappel, LLC (57) ABSTRACT

A method, a system and a processing device for simultaneous manual retooling of at least two units or for simultaneous exchange of at least two format parts within a processing device. The processing device includes at least two working areas, each including a retooling area, a working opening and an activation device. The working openings exist in an open retooling state or in a closed processing state. For retooling at least two of the working openings are opened. The actual state of the working openings of at least two working areas is determined. Furthermore the activation of at least one activation device is recognized. If the activation devices of open working openings are activated simultaneously, a repositioning of convertible units or format parts is triggered.

13 Claims, 7 Drawing Sheets

(56) References Cited

U.S. PATENT DOCUMENTS

| | | | |
|---|---|---|---|
| 2005/0189703 A1* | 9/2005 | Okazaki | B65G 57/04 271/207 |
| 2009/0178264 A1* | 7/2009 | Stoiber | B29C 33/306 29/401.1 |
| 2009/0271025 A1 | 10/2009 | Brauchle | |
| 2010/0327474 A1 | 12/2010 | Hirdina | |
| 2011/0059197 A1 | 3/2011 | Duclos et al. | |
| 2011/0061690 A1 | 3/2011 | Seger | |
| 2011/0202351 A1* | 8/2011 | Plocher | G10L 15/22 704/275 |
| 2012/0126461 A1 | 5/2012 | Duclos et al. | |
| 2012/0251648 A1 | 10/2012 | Duclos et al. | |

FOREIGN PATENT DOCUMENTS

| | | |
|---|---|---|
| CN | 102020092 | 4/2011 |
| DE | 10 008 221 | 8/2001 |
| DE | 10 2008 004 773 | 7/2009 |
| EP | 2 050 557 | 4/2009 |
| JP | 201111546 | 1/2011 |
| WO | WO 2011 026 963 | 3/2011 |
| WO | WO 2011 076 714 | 6/2011 |

* cited by examiner

SIMULTANEOUS RETOOLING OF PROCESSING DEVICES

The present invention relates to a method for simultaneous manual retooling of at least two units or simultaneous exchange of at least two format parts within one processing device, a system for simultaneous manual retooling and an accordingly convertible processing device.

BACKGROUND

In the packaging industry the processing devices or machines used for the production of packaging articles, as well as the machines for the production of packagings, machines for grouping of articles or packs etc. need to be adjusted frequently, according to the respectively manufactured product. The machines can be retooled or adjusted, for example, by exchanging format parts or by adjusting certain parts of the machinery.

If, for example, a new bottle shape is to be produced in a blow molding device, the blow molds must be exchanged accordingly. This is preferably done manually or semi-automatically or in a fully automated process at a designated accessible position on the blowing wheel. The facilities required for semiautomatic changes or fully automatic changes are very costly. A change of format parts by operating personnel is associated with a high time requirement.

In the following example, the manual exchange of blow molds by a human operator is described. After the exchange of a first blow mold, the blowing wheel is rotated by a corresponding angle. Now the next blow mold is in the respective retooling position and can be replaced. The blowing wheel only moves, when the operator presses an appropriate control switch. This ensures that the operator is not within the range of movement of the blowing wheel. The operation of the control switch triggers the rotation of the blowing wheel. Because only one operator can work on the machine and replace only one format part at a given time, this retooling method is very time consuming. It would be conceivable, to set up at least two retooling positions. In this setup two format parts can be exchanged simultaneously. Thereby the time required for retooling, I,e, the time during which the machines are not available for production, can be reduced, and especially halved. The problem to be solved hereby is that the safety of both operators must always be guaranteed.

Devices are known, which comprise several working openings for the exchange of format parts and/or for other reparation works or other maintenance works. However, only one of the working openings may be open at a given time. Otherwise the rotation of the blowing wheel within the blow molding machine cannot be triggered manually by an operator. The presented problem is usually resolved in the following way: the second operator leaves his working area and closes and/or locks the respective working opening. Only then the rotation of the blowing wheel can be triggered by the first operator via a control switch. The resulting working method is complicated and time consuming. In particular, this working method does not lead to a significant reduction in the time required for the retooling process.

DE 10 2008 004 773 A1 describes a method for retooling a blow molding device, wherein the blow molding device comprises at least two working areas, within which different processes can be performed simultaneously. In particular, processes are carried out simultaneously, which require approximately the same time for retooling. If the time required for the various processes varies, then the time required for retooling is defined by the time requirement of the slowest process. This patent application specifically refers to the automated retooling of a blow molding device. It does not indicate how the safety of an operator can be guaranteed during manual retooling.

SUMMARY OF THE INVENTION

The object of the invention is to allow a simultaneous manual retooling of processing devices in at least two different working areas, whereby the safety of the at least two operators is always ensured, without one of the operators having to leave and lock his working area completely.

The present invention provides a method for simultaneous manual retooling of at least two units or for simultaneous exchange of at least two format parts within one processing device. The invention especially relates to a method for the retooling of packaging devices and/or further devices, which are used in the beverage industry. Particularly it relates to processing devices used in the production and processing of bottles, during filling of bottles, labeling of bottles etc. Using the described method at least two blow molds of a blow molding machine, which is used for the production of bottles from preforms, can be exchanged at the same time. With this method two different retooling processes can be performed simultaneously on one machine. Preferentially the two different retooling processes each require about the same amount of time. For example, a filling device, used for filling bottles or the like with the corresponding beverage or any other liquid, can be retooled at the filling unit and at the capping unit simultaneously. In particular, the filling unit is adjusted according to the new bottle shape and the closer heads of the capping unit are exchanged according to the requirements of the new bottle shape.

For carrying out the method according to the invention, the respective processing device includes specific safety devices. Therefore the invention further relates to a respective processing device.

The processing device comprises at least two working areas for adjusting the processing device to the respective products. The working areas each comprise a retooling area, a working opening and an activation device. The working openings can assume two defined actual states, especially an open retooling state and a closed processing state. In the open retooling state the retooling area is accessible and a manual intervention within the processing device is possible. In the closed processing state the retooling area is not accessible and a manual intervention within the processing device is not possible. In the normal state=processing state of the processing device the working openings of all working areas are in a closed state. As soon as one of the working openings is opened, the operation of the processing device is automatically stopped. This prevents a manual intervention within the processing device during an ongoing operation.

For the simultaneous manual retooling of the processing device at least two working openings are opened. Thereby the normal operation of the processing device is interrupted. The normal operation of the processing device cannot be resumed as long as at least one of the working openings is still open. Movement of parts of the processing device within the processing device may only take place if it can be ensured that there is no operator within the danger zone of the processing device. This especially comprises any movement of the units to be converted next or any movement of format parts within the processing device.

Therefore, the actual state of the working openings is determined first. In particular, it is determined whether any working openings are open and which working openings are open.

At least one detection device is provided for this purpose. The detection device may be part of a control unit. Alternatively the data recorded by the detection device is transmitted to a control unit.

Specific activation devices are assigned to each of the open working openings. A repositioning of at least two convertible units or format parts can be triggered by the activation of the activation device by the respective operator. However, this repositioning is only triggered or activated when the activation devices of all open working openings are activated simultaneously. This ensures the safety of the operators. The activation devices are especially mounted within or to the processing device in such a way, that they cannot be activated accidentally. Therefore, the operator has to trigger the activation of the activation device consciously. This ensures that the operator is not within the danger zone of the processing device at the time of the activation of the activation device.

The activation of the activation device is transmitted to a control unit. The control unit coordinates the data of the actual states of the working openings and the activation of the activation devices, which are respectively associated to open working openings. When the activation devices of all open working openings are operated simultaneously, the control unit activates the repositioning of the convertible units within the processing device.

If none, just one, or only a part of the activation devices of the open working openings are activated, there is no repositioning of the convertible units and format parts within the retooling areas. In particular, a repositioning of the convertible units and format parts is actively prevented. This is a special safety mechanism, which ensures that all operators are outside of the danger zone. If, for example, two working areas are open, then both activation devices associated with these two working areas have to be triggered simultaneously. If three retooling areas are provided and all three working areas are open, then all three activation devices associated with the three working areas have to be triggered simultaneously. There is no repositioning within the processing device if only one or two of the activation devices is/are triggered.

The detection device detects the opening state of the working areas. According to a preferred embodiment the detection device can be integrated directly into the control unit. The detection device may comprise, for example, a contact sensor or a magnetic sensor. The sensor indicates that the door is open and the contact is thus interrupted. Alternatively, an image recognition sensor, a light barrier or the like can be used. The generated signals are then evaluated respectively by the control unit.

The activation device is preferably a pressure sensitive element, in particular a touch control switch, a push button or similar. Particularly, the activation device cannot be triggered accidentally. To ensure the safety of the operator, the operator must trigger the activation device consciously. This is ensured by the fact that the activation device is placed within or on the processing device in such a way that it cannot be triggered accidentally. In order to trigger the activation device, the operator has to move out of the danger zone at least partially. Alternatively and/or additionally, for example, a certain pressure has to be applied onto the activation device for a certain minimum time. Only then the control unit triggers the repositioning within the processing device.

The working areas may comprise communication means. These allow the at least two operators to coordinate their work. For example, an illumination means or an acoustic means may be provided, which is activated in the second working area as soon as the operator in the first working area activates his activation device. Accordingly, an illumination means or an acoustic means is also provided within the first working area, which is triggered by the activation of the activation device within the second working area. As illumination means, for example, a lamp can be provided, which lights up when the other operator presses the touch control switch etc. However, if an acoustic signal is used as communication means, preferably it only gives a short sound-signal. Alternatively, a radio communication system can be provided for an oral communication between the at least two operators. The radio communication system can be either integrated within the working areas or the radio communication system can be working via a head intercom system.

The processing device may be a device with a rotating working star, where format parts have to be adjusted according to the new product. Hereby a rotation of the working star by a specific angle is triggered by the control unit. Thereby the format parts to be exchanged next are repositioned; especially the format parts are repositioned within the retooling areas. For example, the angle of rotation is entered manually into the control unit. Alternatively, the control unit itself calculates the necessary angle of rotation of the working star, depending on how many working areas are open.

The processing device may also be a device with an at least partially linear working area comprising a plurality of convertible units or exchangeable format parts. In this case, the control unit triggers a movement of the units or format parts by a predetermined distance. Thereby the units or format parts to be replaced next are repositioned into the respective retooling areas. Again, the movement distance may vary depending on the number of open working areas.

A processing device with multiple working areas for simultaneous manual retooling can still be further manually within just one working area. This might be necessary if the processing device is to be retooled by just one operator due to staff shortages. If only one working opening is open at a given time, then only the activation of the activation device assigned to this respective working area is necessary to trigger the respective movement within the processing device.

The invention further relates to a system for controlling a processing device during retooling or during adjustment of the processing device according to the requirements of the new product. The system comprises detection means or the like, for example sensors, for identifying the opening state of the working openings in at least two different working areas. Furthermore, the system detects the activation of activation devices and assigns these signals to the respective open working openings. If the activation devices of all open working openings are activated simultaneously, the system controllably triggers a repositioning of the convertible units or of the format parts to be exchanged. Furthermore it may be provided that the operator obtains a corresponding signal, for example, an acoustic and/or an optical signal, when the appropriate repositioning has taken place.

The described invention overcomes the disadvantages of conventional devices during retooling and/or maintenance of the devices. The required time can be reduced significantly without any major additional costs.

A specific embodiment of the invention will now be described with reference to a shaping device, in particular with reference to a blow molding device. In order to switch the production process to a new product, especially to a different bottle shape, the blow molding device must be equipped with new blow molds. The retooling or exchange of the blow molds is done manually by at least two operators working in at least two different working areas in a so-called jog mode. Touch control switches are provided within the retooling areas, whereby the touch control switches are located inside the blow molding device but outside of the range of the blowing wheel. For a repositioning of the blowing wheel within the blow molding device, the touch control switches must be activated simultaneously by the at least two operators. To move the blow molds in a blow molding device as required, for example, two corresponding touch control switches have to be operated simultaneously at the two retooling areas. The blow molds to be exchanged next are then positioned in the respective retooling positions. The touch control switches can be arranged within the working areas in such a position, where the operator is possibly still within the danger zone of the blowing wheel. Since the activation of the touch control switches only triggers a very slow movement of the blowing wheel, generally there is no danger for the operator. The remaining risk is minimal and must be taken into account. If a problematic situation arises, the operator releases the touch control switch, thereby immediately stopping the blow molding device.

The retooling positions of the blow molds are particularly predefined by a control unit. The jog mode automatically stops the blowing wheel at the next retooling positions. Now the blow molds can be exchanged by the two operators. A restart of the jog mode requires the simultaneous triggering of the two touch control switches by both operators.

Furthermore, the targeted movement to a certain retooling position is also possible during operation of the blow molding device in a so-called half- or variable loading mode. With a pre-selection of a particular load and with an appropriate programming of the control unit of the respective blow mold carriers carrying the blow mold to be removed and/or exchanged next can be repositioned specifically. It is conceivable that the blow mold to be exchanged or the blow mold carrier to be opened can be labeled by an optical signal, with a RFID chip or the like. Different optical signals can be used for labeling different format parts or for distinguishing between different retooling processes.

Furthermore, it can be provided that the second operator gets a signal when the first operator presses his touch control switch. For this purpose, optical and/or acoustic signals can be used. Furthermore, it can be provided that the operators can communicate by word of mouth or with radio communication systems. For this purpose the retooling areas may, for example, comprise intercoms for radio communication, wireless headsets or something similar.

Another possibility is the use of a two-hand switch within each working area. The two-hand switch is actuated by the respective operator after completion of the retooling process. A two-hand switch is a switch that can only be operated with both hands. This ensured that both hands of the respective operator are on the switch at the time of the actuation. Again, a movement of the device can only be triggered by the first operator, if the second operator is triggering his two-hand switch simultaneously. However, the use of two-hand switches is less convenient, more expensive, more complex to control and also requires more space within the working area.

According to another embodiment a photocell is used in one of the retooling areas. The photocell recognizes if the second operator is within the danger zone of the blowing wheel. The rotation of the blowing wheel can only be triggered by the first operator id it is ensured that the second operator is not within the danger zone. Hereby, however, it cannot be ensured that the exchange of the blow mold is already completed by the second operator. Therefore an additional communication means should be provided, allowing the operators to coordinate the operation of the blow molding device respectively. If the second operator accesses the danger zone during rotation of the blowing wheel, this is recognized by the photocell and the rotation of the blowing wheel is stopped immediately.

The advantages of the device, the system and method are, in particular, that a simpler and faster operation is possible during manual retooling of the processing device. Particularly, a simpler and faster operation is possible during simultaneous retooling of format parts. At the same time the safety of the operators is ensured. The setup or retooling time can be reduced considerably without large additional costs. Therefore the processing device can restart processing more quickly. The precisely defined approach of the respective retooling position also allows an ergonomic favorable positioning of resources and required tools on special supports, for example, on so-called equipment boards or the like.

The method can also be used to retool a device with half loading or variable loading. At half load, only every second format part is retooled, for example, only every second blow mold is exchanged for a new blow mold. With a variable load, any number of format parts can be retooled. For example, the 1st, 2nd, 4th, 5th, 7th, 8th etc. blow mold is exchanged while the 3rd, 6th, 9th etc. blow mold remains. Through proper control of the movement of the device, greater process reliability can thus be achieved, even when the retooling is done only by one operator. The proper control counteracts the danger of confusion or incorrect installation of format parts by just one operator.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

The same or equivalent elements of the invention are designated by identical reference characters. Furthermore and for the sake of clarity, only the reference characters relevant for describing the respective figure are provided. It should be understood that the embodiments described are only examples and they are not intended to limit the scope of the disclosure.

Figure 1:
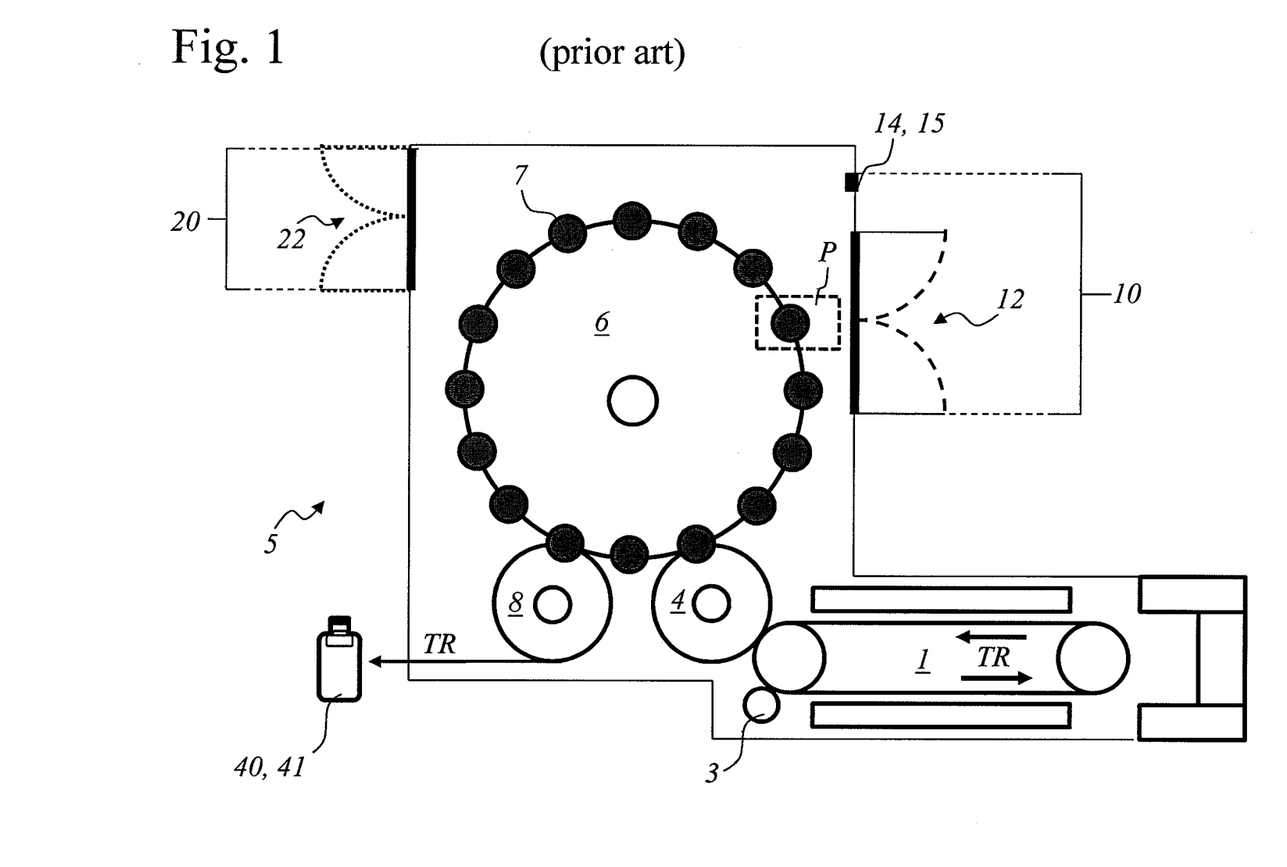
FIG. 1 shows a schematic view of a blow molding device with a working area for exchanging the blow molds according to the known prior art.

FIG. 1 shows a schematic view of a blow molding device 5 with a working area 10 for exchanging blow molds 7 according to the known prior art. A blow molding device 5 is used to produce containers 40, in particular bottles 41, from so-called preforms. First the preforms are fed into a heating device 1 via an inlet star 3. In the heating device 1 the preforms are tempered to the required temperature, necessary for the subsequent blow molding process. Subsequently the preforms are passed through a transfer star 4 to the blow molding device 5. In particular one preform each is passed to one of the blow molds 7, which are attached to a blowing wheel 6. In the blow mold 7 the preform is blow molded into the respective container 40, 41. The container 40, 41 is subsequently fed in transport direction TR to further processing devices (not shown) via an outlet star 8. Further processing devices may include a filler, a labeling device or the like.

If the blow molding device 5 is to be used to produce containers of another shape, the blow molds must be exchanged accordingly. In the shown embodiment a working area 10 is provided within the retooling area P. The retooling area P comprises a working opening 12, for example a door opening, a window opening or the like, and a safety device 14. The safety device 14 may be a push button or a toggle switch 15, which is mounted inside the blow molding device 5. After the exchange of the blow mold 7 within the retooling area P, the operator operates the switch 15. Thereby a rotation of the blowing wheel 6 by a given angle is triggered. Now the blow mold 7 to be exchanged next is arranged within the retooling area P and can be replaced by the operator. The safety device 14 is mounted inside the blow molding device 5. The position of the safety device 14 is especially chosen to make sure that the operator is not within the direct danger zone of the blowing wheel 6 while he is operating the switch 15. Additionally, the rotation of the blowing wheel is very slow. This provides further safety for the operator. If a problematic situation arises, the operator releases the switch 15. This leads to an immediate stop of the blowing wheel 6.

Furthermore, the blow molding device 5 may have a second working area 20. This might be required, for example, to perform maintenance work or repair work on the blow molding device 5. For safety reasons, both the first working opening 12 and the second working opening 22 can only be opened when the blow molding device 5 is at a standstill. Furthermore, a safety mechanism is provided, which actively prevents a movement of the blowing wheel. Therefor no movement can be triggered from the outside, as long as one of the working openings 12, 22 is still open. In the blow molding device 5 known from prior art, an opening of the working opening 22 of the second working area 20 is only possible, if the working opening 12 of the first working area 10 is closed. For example, a special control mechanism is provided. If this control mechanism detects an open first opening 12, it activates a locking mechanism to prevent a simultaneous opening of the second working opening 22. Correspondingly, the first working area 10 can only be opened and be worked therein when the second opening 22 of the second working area 20 is closed.

These safety measurements ensure that only one operator carries out replacement works, maintenance works or repair works on a blow molding device 5 at a given time. This particularly ensures that there is no second operator within the danger zone of the blowing wheel 6 while a first operator, for example, after a successful exchange of a blow mold 7, triggers a rotation of the blowing wheel 6 in order to exchange further blow molds 7.

Figure 2:
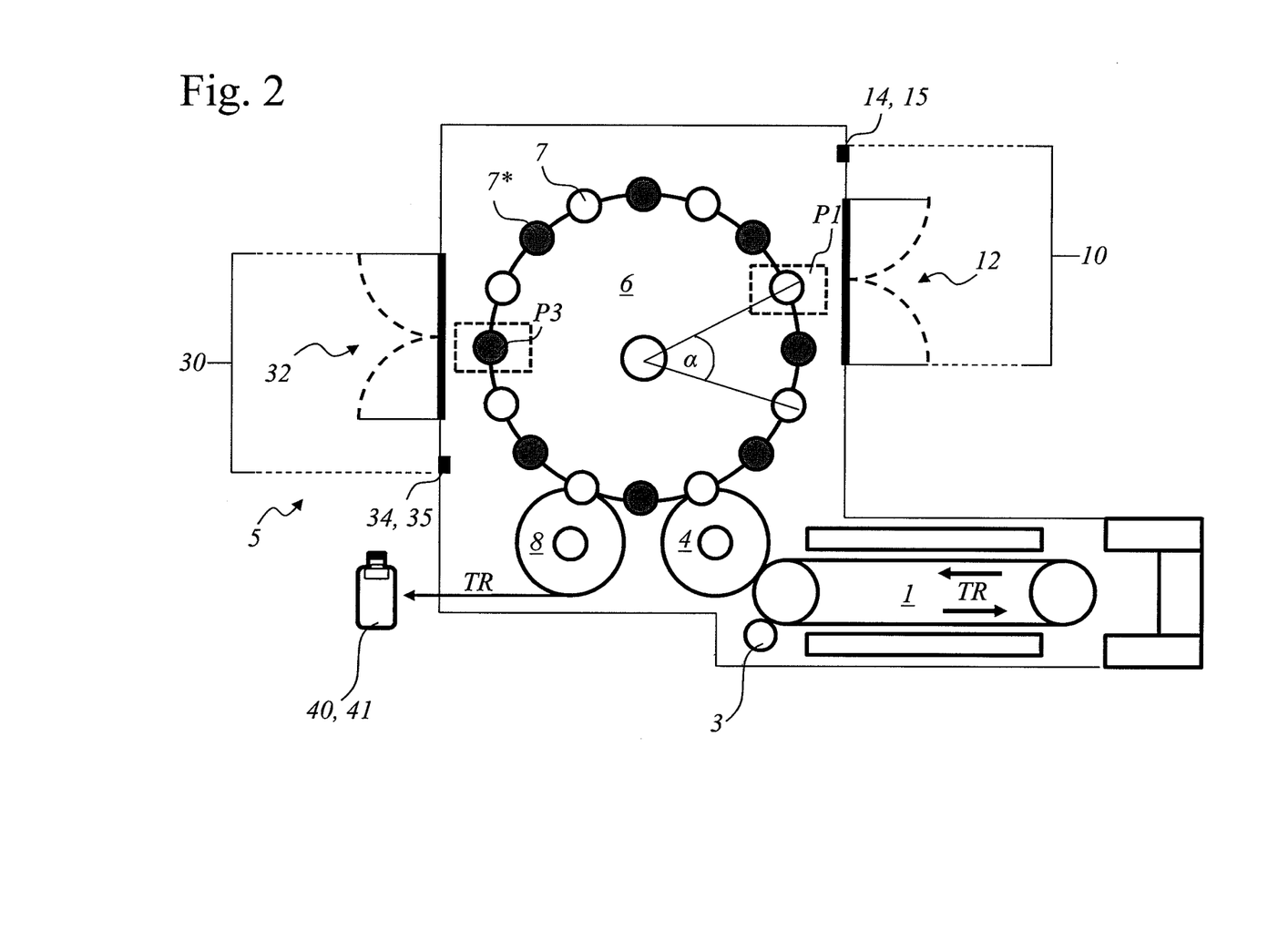
FIG. 2 shows a schematic view of a blow molding device with two working area for exchanging the blow molds.

FIG. 2 shows a blow molding device 5 with a first working area 10 for exchanging the blow molds 7 in a first retooling area P1 by a first operator. The blow molding device 5 furthermore comprises a second working area 30 for simultaneously exchanging further blow molds 7 in a second retooling area P3 by a second operator.

The second working area 30 is constructed analogous to the first working area 10. It also comprises a working opening 32 as well as a safety device 34, especially a toggle switch 35 or the like. The toggle switch 35 is mounted within the blow molding device 5 in such a way that the operator must move out of the rotation area or out of the danger zone of the blowing wheel 6 at least partially in order to trigger the safety device 34. If both working openings 12, 32 are open at the same time, a rotation of the blowing wheel 6 can only be triggered if both operators actuate their respective switches 15, 35 simultaneously. This ensures that both operators are not within the danger zone of the blowing wheel 6, while it rotates to move further blow molds 7, 7* into the respective retooling areas P1, P3. Furthermore, it can be provided that the blow mold 7, 7* to be exchanged next is marked with a light signal, a light spot or the like. This will avoid mistakes by confusion. Particularly, it can be avoided that a blow mold 7, 7*, which has been replaced already by the first operator, is replaced again by the second operator.

Preferably the rotation of the blowing wheel 6 takes place in steps, whereby the blowing wheel 6 moves about an angle $\alpha$. Thereby only every second blow mold 7, 7* assumes the respective position within the retooling area P1 or within the retooling area P3. Thus the first operator exchanges all blow molds 7 at positions 2n+1, where n=0, 1, 2, ..., n. Instead, the second operator changes all blow molds 7* at the positions 2n, where n=0, 1, 2, ..., n. Compared to the known prior art, the time required for the retooling of the blow molding device is thus halved. The times of standstill can thus be reduced significantly and the throughput of the device can be increased, thereby still guaranteeing the safety of the operators.

Preferably at least one detection device is provided, which detects the state of the working openings 12, 32. The detection device is in particular coupled to a controller 50 and detects whether the working openings 12, 32 are each in an open and/or a closed state.

Figure 3:
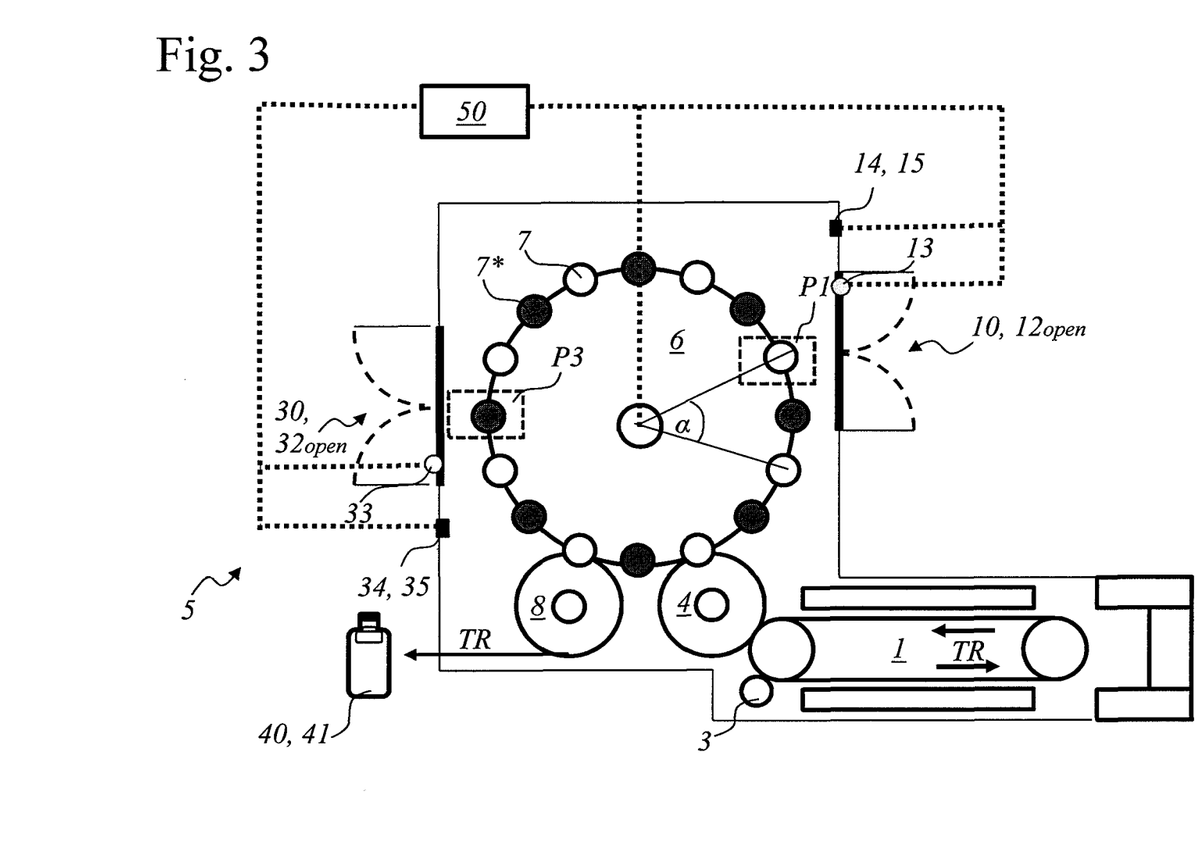
FIG. 3 shows the simultaneous exchange of blow molds within two retooling areas of a blow molding device according to FIG. 2.

FIG. 3 depicts the situation wherein two operators simultaneously exchange blow molds 7, 7* at the two retooling areas P1, P3. This is only possible if both working openings 12 and 32 are open. Appropriate sensors 13, 33 are coupled to the control unit 50 and the working openings 12, 32. Via the sensors 13, 33 the control unit 50 detects, if the working openings 12 and 32 are open. If one of the switches 15 or 35 is activated by one of the operators, the control unit 50 prevents a rotation of the blowing wheel 6. However, if both switches 15 and 35 are operated simultaneously, the rotation of the blowing wheel 6 by a defined angle $\alpha$ is activated, thereby moving the blow molds 7, 7* to be replaced next to the respective retooling areas P1 or P3. It is particularly important, that the two working areas 10, and in particular the two switches 12, 32 are arranged in such a way that they cannot be operated simultaneously by just one of the operators.

Figure 4:
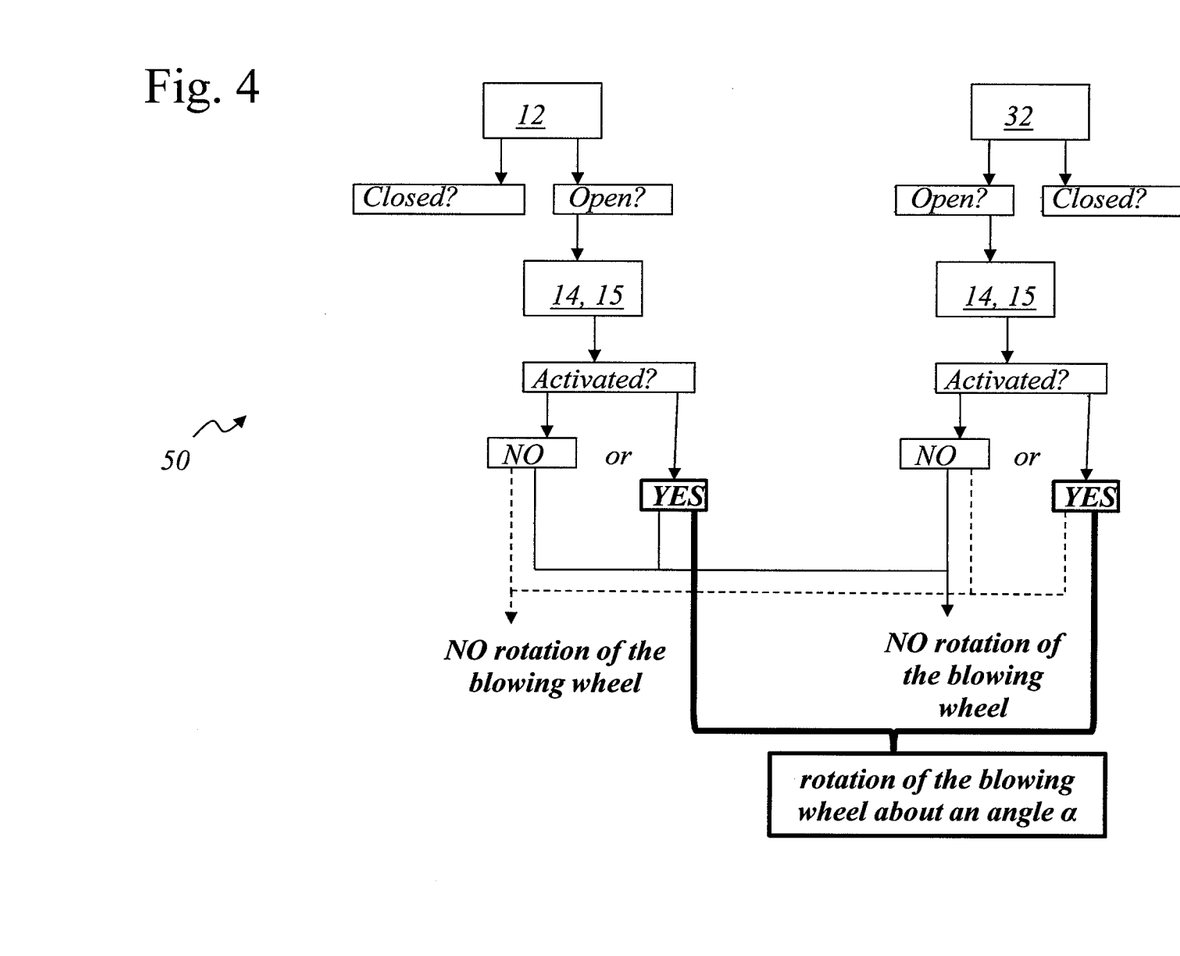
FIG. 4 schematically shows an analysis of the device parameters of A device according to FIG. 3 by the control unit.

FIG. 4 schematically shows an analysis of the device parameters by the control unit 50 according to the embodiment with two open working areas 10, 30 shown in FIG. 3.

The control unit determines if the working openings 12, 32 of the working areas 10, 30 are open and/or closed (see FIG. 3). This can be done, for instance, with the aid of sensors. If both working openings 12, 32 are open, the control unit only triggers a defined rotation of the blowing wheel about an angle $\alpha$ if both safety switches 15 and 35 are actuated by both operators simultaneously. If just one of the switches 15 or 35 is activated, there is no rotation of the blowing wheel. This ensures that rotation of the blowing wheel only takes place when both operators are outside of the danger zone.

Figure 5:
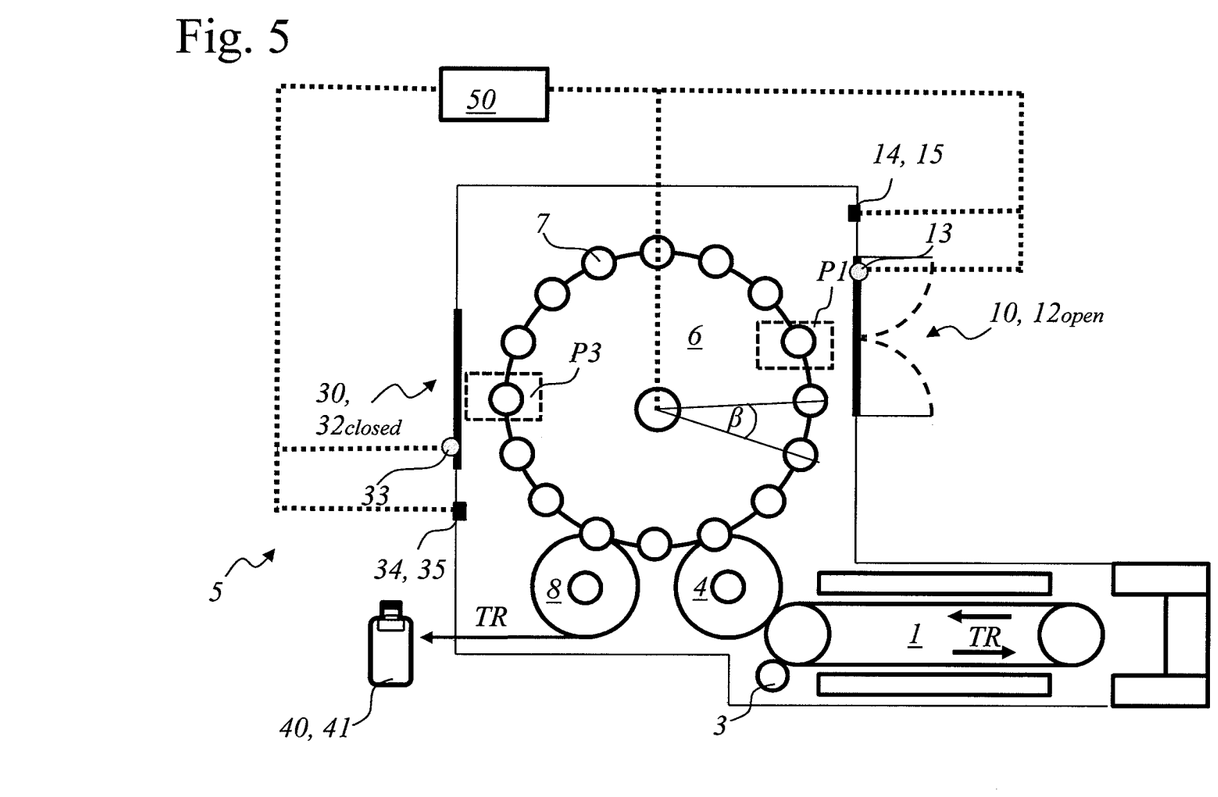
FIG. 5 shows the exchange of blow molds within just one retooling area of a blow molding device according to FIG. 2.
Figure 6:
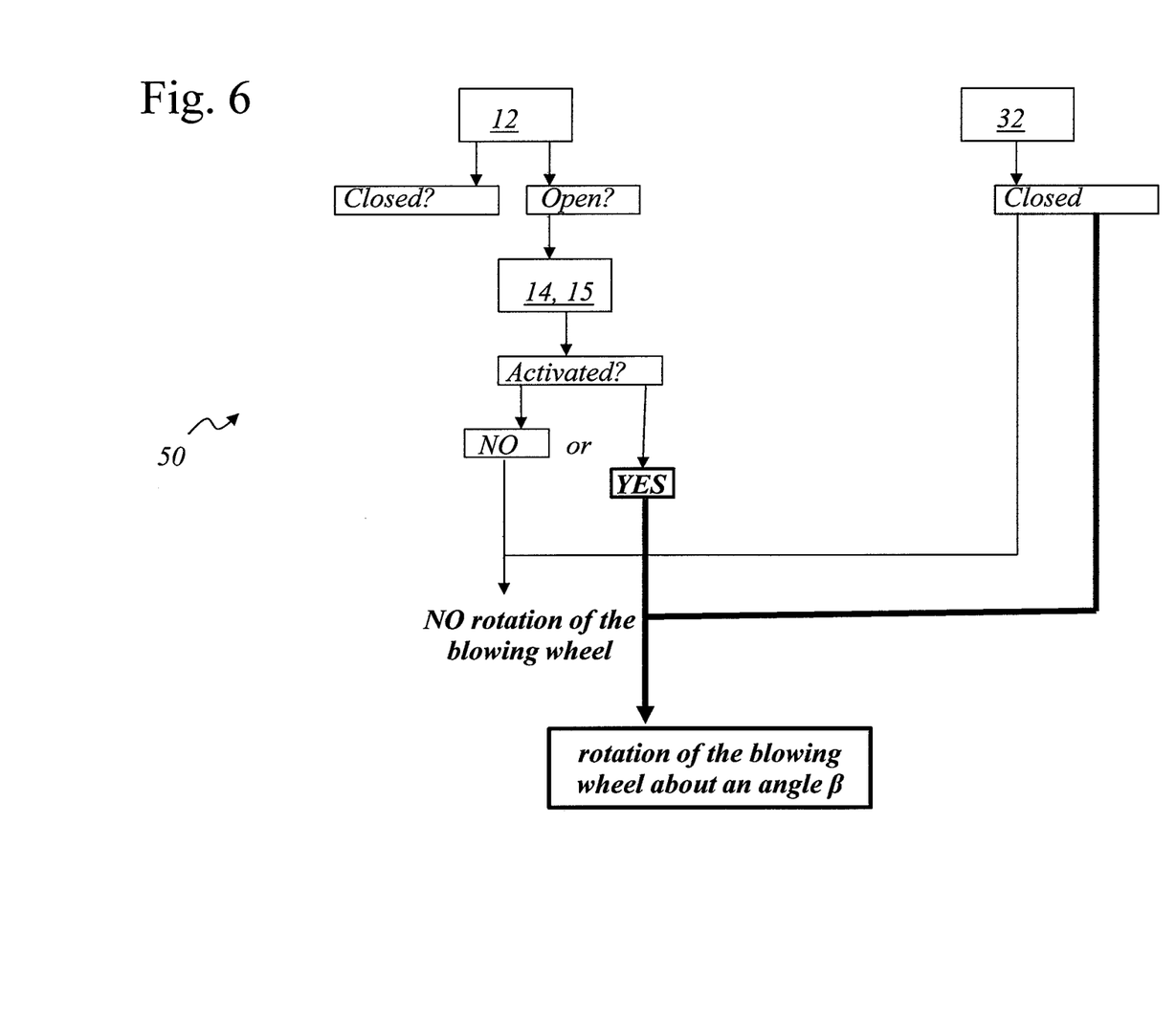
FIG. 6 schematically shows an analysis of the device parameters of a device according to FIG. 5 by the control unit.

FIG. 5 shows the exchange of blow molds 7 in just one retooling area P1 of a blow molding device 5 according to FIG. 2. FIG. 6 schematically shows an analysis of the device parameters by the control unit 50 according to FIG. 5.

The control unit 50 recognizes that only the working opening 12 in the first working area 10 is open, while the working opening 32 in the second working area 30 is closed. Due to the parameters stored in the control unit 50 a rotation of the blowing wheel 6 is now already triggered, if only the one safety switch 15 is operated, which is assigned to the respective working area 10. The activation of the switch 15 triggers rotation of the blowing wheel 6, in particular a rotation by a rotation angle β. Thereby the neighboring blow mold 7 is moved into the retooling area P1. The description applies analogously to the situation, in which the blow molds 7 are only replaced in the second working area 30, i.e. where the blow molds 7 are only replaced in the retooling area P3.

If only one of the working openings 12 or 32 is open, the double safety mechanism is automatically switched off by the control unit 50. The movement of the blowing wheel is triggered by operation of the one corresponding switch 15 or 35, which is assigned to the respective open working opening 12 or 32. Thus, even in the blow molding device 5 according to FIG. 2 an exchange of blow molds 7 by a single operator is still possible. According to an alternative embodiment, the information whether the retooling is carried out by one operator or two operators can be entered into the control unit 50. The control unit 50 then adjusts the rotation of the blowing wheel 6 accordingly.

Figure 7:
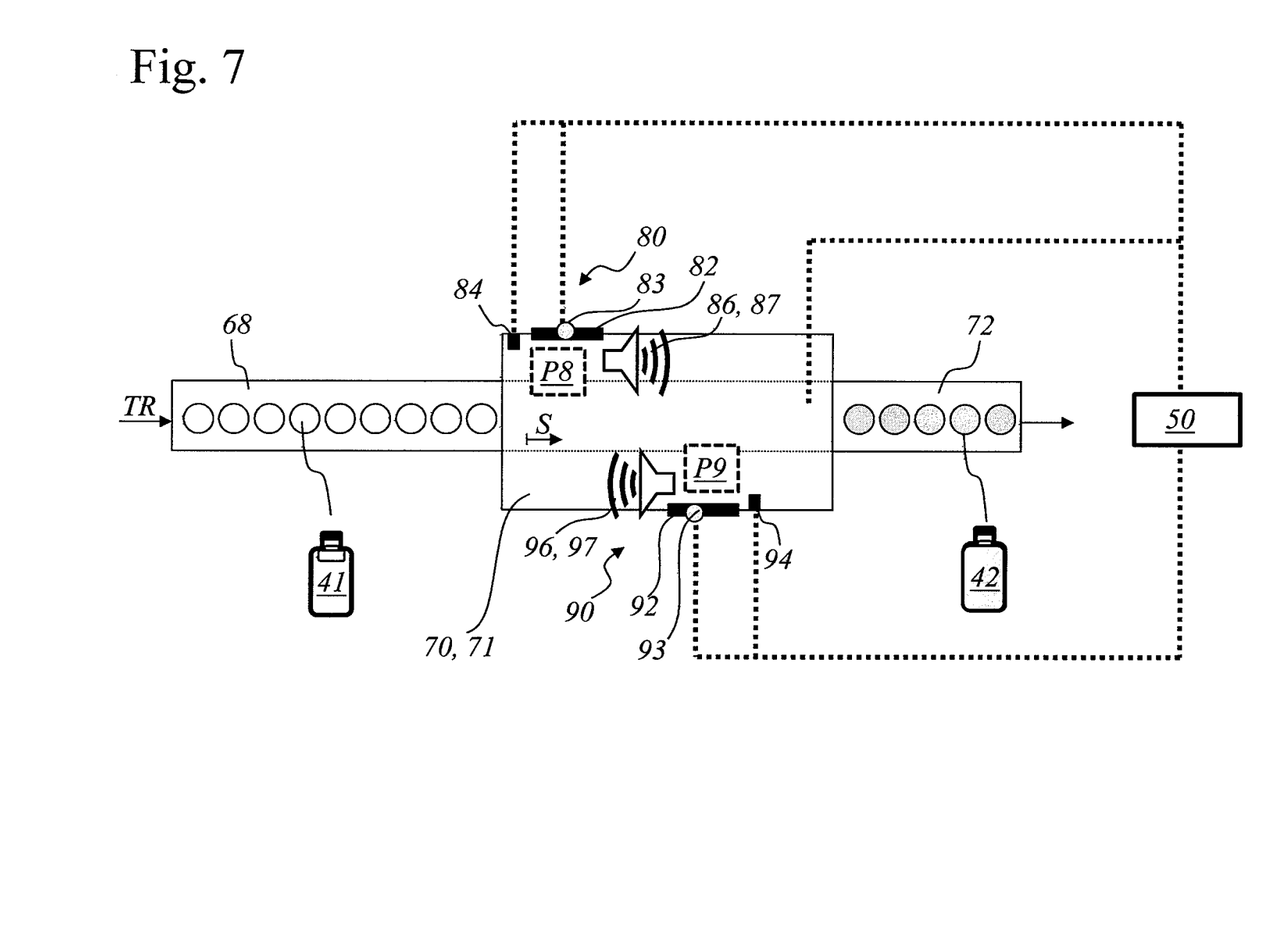
FIG. 7 shows a processing device comprising an at least partially linear processing section.

FIG. 7 shows a processing device having an at least partially linear processing section. Schematically, a filler 71 is shown, wherein bottles 41 are filled with a beverage and closed. The empty bottles 41 are transported in a transport direction TR via a first conveyor belt 68 to the filler 71. In the filler 71, the bottles 41 are filled and closed. The filled and closed bottles 42 are then transported to further processing devices via a subsequently arranged conveyor belt 72, for example they are transported to packaging machines or the like (not shown).

At the filler 71 two working areas 80, 90 are provided for adjustments and retooling. The two working areas 80, 90 each comprise a retooling area P8, P9, a working opening 82, 92 and an activation device 84, 94. When the working opening 82 of the first working area 80 is open, an adjustment of the format parts can be carried out in the retooling area P8, whereby the filler 71 is adapted according to the requirements of the new product. In particular, an adjustment to the particular shape of the container 40, which are to be filled, is required. Meanwhile, the closer heads are exchanged in the retooling area P9 of the second working area 90. These also need to be a adapted according to the requirements of the new product. Sensors 83, 93 are provided for this purpose. They forward the actual states of the working openings 82, 92 to a control unit 50. The control unit 50 furthermore detects the activation of the activation devices 84, 94 and coordinates all the obtained data. The control unit 50 furthermore controls the repositioning of respective units, which need to be retooled or readjusted.

According to FIG. 7 communication means 86, 96 are provided within the working areas 80, 90. The communication means 86, 96 allow the communication between the operators, for example, via a radio communication system 87, 97.

The invention has been described with reference to preferred embodiments. To the expert it is also conceivable, however, to make changes and modifications without leaving the scope of protection of the appended claims.

LIST OF REFERENCE NUMBERS 1 heating device
3 inlet star
4 transfer star
5 blow molding device
6 blowing wheel
7, 7* blow mold
8 outlet star
10 working area
12 working opening
13 sensor
14 safety device
15 toggle switch/switch/safety switch
20 working area
22 working opening
30 working area
32 working opening
33 sensor
34 safety device
35 toggle switch/switch/safety switch
40 container
41 bottle
42 filled and closed bottle
50 control unit
68 conveyor belt
70 processing device
71 filler
72 conveyor belt
80 working area
82 working opening
84 activation device
86 communication means
87 radio communication system
90 working area
92 working opening
94 activation device
96 communication means
97 radio communication system
α, β angle of rotation
P, P1, P3, P8, P9 retooling area
S distance
TR transport direction

The invention claimed is:

1. A method for simultaneous manual retooling of at least two units or for simultaneous exchange of at least two format parts or convertible units within a processing device comprising at least two working areas, each of the working areas comprising a retooling area, a working opening and an activation device, the working openings each capable of assuming an open retooling state or a closed processing state, the method comprising the steps of:

opening at least two of the working openings for a simultaneous retooling of the processing device; the processing device being a blow molding device with a rotating blowing wheel;

determining an actual state of the working openings of at least two working areas;

recognizing the activation of at least one activation device; and triggering a repositioning of at least two format parts or convertible units in the at least two retooling areas, if the activation devices of all open working openings are activated simultaneously, or not triggering the repositioning of the at least two format parts or convertible units in the at least two retooling areas or actively preventing the repositioning if none, just one or just a part of the activation devices of all open working openings are activated simultaneously;

the repositioning including a rotation of the blowing wheel about an angle so that a next blow mold of the at least two format parts or convertible units is moved into one of the two retooling areas.

2. The method as recited in claim 1 wherein the activation device is triggered or activated by operating a touch control switch.

3. The method as recited in claim 1 wherein a control unit triggers the rotation.

4. The method as recited in claim 1 wherein the repositioning of the units to be converted next or the repositioning of the exchangeable format parts is controlled according to the number of working areas, a retooling or exchange being performed simultaneously.

5. The method as recited in claim 4 wherein the angle of rotation or a distance of movement of the units to be retooled next or the exchangeable format parts are input into a control unit or calculated automatically by the control unit.

6. The method as recited in claim 4 wherein operators communicate with each other to coordinate simultaneous activation of the activation devices.

7. The method as recited in claim 1 wherein the determining step includes determining which of the working openings is in an open state.

8. A blow molding device comprising:
- a rotating blowing wheel, the blowing wheel being a processing device comprising:
- a working area for adjustment of the processing device according to the processed products, the working area including a retooling area, a lockable working opening and an activation device;
- at least one further working area including a further retooling area, a further lockable working opening and a further activation device, the working area and the further working area for simultaneous retooling of the processing device in the retooling and further retooling areas, the working area and further working area each capable of assuming an open retooling state or a closed processing state;
- at least one detector for detecting the state of the working opening and further working opening and/or for detecting the activation of the activation and further activation devices;
- at least one control unit for coordination of data from the at least one detector and for controlling repositioning of at least two units to be converted next or exchangeable format parts, the repositioning including a rotation of the blowing wheel about an angle so that a next blow mold of the at least two format parts or convertible units is moved into one of the retooling area and the further retooling area;
- the control unit is configured to trigger the repositioning of at least two format parts or convertible units in the at least two retooling areas, if the activation devices of all open working openings are activated simultaneously, or not trigger the repositioning of the at least two format parts or convertible units in the at least two retooling areas or actively preventing the repositioning if none, just one or just a part of the activation devices of all open working openings are activated simultaneously.

9. The processing device as recited in claim 8 wherein the detector is integrated into the control unit.

10. The processing device as recited in claim 8 wherein the detector is a contact sensor, an image recognition sensor, a magnetic sensor or a photocell.

11. The processing device as recited in claim 8 wherein the activating devices are touch control switches.

12. The processing device as recited in claim 8 wherein the working areas each comprise a communication device.

13. The processing device as recited in claim 8 wherein the processing device is a shaping device.

* * * * *